United States Patent
Kruecker et al.

(10) Patent No.: US 11,562,487 B2
(45) Date of Patent: Jan. 24, 2023

(54) LANDMARK VISUALIZATION FOR MEDICAL IMAGE SEGMENTATION

(71) Applicant: KONINKLIJKE PHILIPS N.V., Eindhoven (NL)

(72) Inventors: Jochen Kruecker, Andover, MA (US); Heinrich Schulz, Hamburg (DE); Thomas Heiko Stehle, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 51 days.

(21) Appl. No.: 16/756,633

(22) PCT Filed: Oct. 15, 2018

(86) PCT No.: PCT/EP2018/078020
§ 371 (c)(1),
(2) Date: Apr. 16, 2020

(87) PCT Pub. No.: WO2019/076791
PCT Pub. Date: Apr. 25, 2019

(65) Prior Publication Data
US 2020/0258233 A1  Aug. 13, 2020

Related U.S. Application Data

(60) Provisional application No. 62/573,711, filed on Oct. 18, 2017.

(51) Int. Cl.
  *G06T 7/11* (2017.01)
  *G06T 7/73* (2017.01)
  *G06T 7/00* (2017.01)
(52) U.S. Cl.
  CPC .............. *G06T 7/11* (2017.01); *G06T 7/0012* (2013.01); *G06T 7/73* (2017.01); *G06T 2207/20101* (2013.01)

(58) Field of Classification Search
  CPC ....... G06T 2200/24; G06T 2207/20101; G06T 2207/20128; G06T 2207/30004; G06T 7/0012; G06T 7/11; G06T 7/73
  See application file for complete search history.

(56) References Cited

U.S. PATENT DOCUMENTS

2010/0295848 A1* 11/2010 Grewer ................... G06T 7/11
                                                   345/419
2012/0230572 A1  9/2012 Kohlberger et al.
(Continued)

FOREIGN PATENT DOCUMENTS

JP           2003299639 A     10/2003

OTHER PUBLICATIONS

Graphics Gmbh vol. 4.6.12 Registration p. 195-198 (Jan. 1, 2001).
(Continued)

*Primary Examiner* — David Bilodeau
(74) *Attorney, Agent, or Firm* — Sherry Austin

(57) ABSTRACT

A controller for preparing an image for segmenting includes a memory that stores instructions, and a processor that executes the instructions. When executed by the processor, the instructions cause the controller to perform a process that includes displaying a first modeled tissue structure of a first type, and displaying an image of a first tissue structure of the first type separate from the first modeled tissue structure. The process also includes identifying, on the first modeled tissue structure, landmarks on the first modeled tissue structure for identification on the image of the first tissue structure, and sequentially accentuating each landmark on the first modeled tissue structure. The processor identifies locations on the image of the first tissue structure for each landmark on the first modeled tissue structure. The landmarks on the first modeled tissue structure are mapped to the locations identified on the image of the first tissue structure.

10 Claims, 7 Drawing Sheets

(56) References Cited

U.S. PATENT DOCUMENTS

| | | | |
|---|---|---|---|
| 2014/0093153 A1 | 4/2014 | Sofka et al. | |
| 2015/0110375 A1 | 4/2015 | Habets et al. | |
| 2015/0317799 A1* | 11/2015 | Akahori | G06T 7/149 |
| | | | 382/128 |
| 2015/0339459 A1* | 11/2015 | Taylor | A61B 8/481 |
| | | | 703/9 |
| 2016/0005166 A1 | 1/2016 | Xu et al. | |
| 2016/0063720 A1 | 3/2016 | Han et al. | |
| 2016/0217591 A1* | 7/2016 | Krupnik | G06T 7/60 |
| 2019/0325572 A1* | 10/2019 | Mansi | A61B 5/0077 |

OTHER PUBLICATIONS

International Search Report and Written Opinion from PCT/EP2018/078020 dated Jan. 9, 2019.

* cited by examiner

LANDMARK VISUALIZATION FOR MEDICAL IMAGE SEGMENTATION

CROSS REFERENCE TO RELATED APPLICATIONS

This application is a U.S. national phase application of International Application No. PCT/EP2018/078020 filed on Oct. 15, 2018, which claims the benefit of U.S. Application Ser. No. 62/573,711 filed on Oct. 18, 2017 and is incorporated herein by reference.

BACKGROUND

Medical image segmentation divides medical images into regions with similar properties. The role of segmentation is to subdivide anatomical structures in the medical images, so as to, for example, study the anatomical structures, identify region(s) of interest, measure tissue volume, and so on. Anatomical structures include bones and organs in a human body, and medical images may include one such anatomical structure or multiple anatomical structures.

Model-based segmentation is a tool for automated or semi-automated medical image segmentation. Models include multiple parts and/or nodes, and consist of a three-dimensional (3D) surface mesh and a set of features that detail anatomical structures. The models of anatomical structures are created based on previous measurements of the same types of anatomical structures from multiple patients. The types of anatomical structures in models are the same types of anatomical structures in the medical images. The 3D surface mesh represents the idealized geometries (e.g., geometric shapes) of the anatomical structures. The set of features describe the appearance of the 3D surface mesh at locations corresponding to different parts and/or nodes. In model-based segmentation, a segmentation algorithm optimizes the matching of features in the models with corresponding locations in the medical images to be segmented.

If one or more structures in the medical image to be segmented contains geometry that differs substantially from the idealized geometry of the 3D surface mesh encoded in the model, the optimization may fail, resulting in the segmentation failing. The failure can be avoided if the model-based segmentation is initialized using information about the approximate position, size, shape or pose of the structure(s) in the medical image to be segmented. One known and efficient way to initialize the segmentation is to identify landmarks in the structure(s) to be segmented. A small number of landmarks, when accurately identified, allow the segmentation algorithm to determine the approximate position, size, shape and pose of the structure(s) to be segmented. This information can be used to initialize and subsequently guide the optimization algorithm, which in turn increases the probability of successful segmentation.

SUMMARY

According to an aspect of the present disclosure, a controller for preparing an image for segmenting includes a memory that stores instructions; and a processor that executes the instructions. When executed by the processor, the instructions cause the controller to perform a process that includes displaying a first modeled tissue structure of a first type; and displaying an image of a first tissue structure of the first type separate from the first modeled tissue structure. The process may also include identifying, on the first modeled tissue structure, landmarks on the first modeled tissue structure for identification on the image of the first tissue structure, and sequentially accentuating each landmark on the first modeled tissue structure. The processor identifies locations on the image of the first tissue structure for each landmark on the first modeled tissue structure. The landmarks on the first modeled tissue structure may be mapped to the locations identified on the image of the first tissue structure.

According to another aspect of the present disclosure, a controller for preparing an image for segmenting includes a memory that stores instructions and a processor that executes the instructions. When executed by the processor, the instructions cause the controller to perform a process that includes displaying a first modeled tissue structure of a first type; and displaying an image of a first tissue structure of the first type separate from the first modeled tissue structure. The process may also include identifying, on the first modeled tissue structure, landmarks on the first modeled tissue structure for identification on the image of the first tissue structure, and sequentially accentuating each landmark on the first modeled tissue structure. The processor identifies locations on the image of the first tissue structure for each landmark on the first modeled tissue structure. After a predetermined number of landmarks and locations are identified, the process may include mapping the predetermined number of landmarks on the first modeled tissue structure to the locations identified on the image of the first tissue structure based on determining that the predetermined number of landmarks and locations are identified.

According to another aspect of the present disclosure, a system includes a memory that stores instructions, and a processor that executes the instructions. When executed by the processor, the instructions cause the processor to perform operations that include displaying a first modeled tissue structure of a first type, and displaying an image of a first tissue structure of the first type separate from the first modeled tissue structure. The process may also include identifying, on the first modeled tissue structure, landmarks on the first modeled tissue structure for identification on the image of the first tissue structure, and sequentially accentuating each landmark on the first modeled tissue structure. The processor identifies locations on the image of the first tissue structure for each landmark on the first modeled tissue structure. The process may further include mapping the landmarks on the first modeled tissue structure to the locations identified on the image of the first tissue structure. Moreover, a second modeled tissue structure of a second type may be displayed. An image of a second tissue structure of the second type may be displayed separate from the second modeled tissue structure. The process may also include identifying, on the second modeled tissue structure, landmarks on the second modeled tissue structure for identification on the image of the second tissue structure, and sequentially accentuating each landmark on the second modeled tissue structure. The processor identifies locations on the image of the second tissue structure for each landmark on the second modeled tissue structure. The process may further include mapping the landmarks on the second modeled tissue structure to the locations identified on the image of the second tissue structure.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
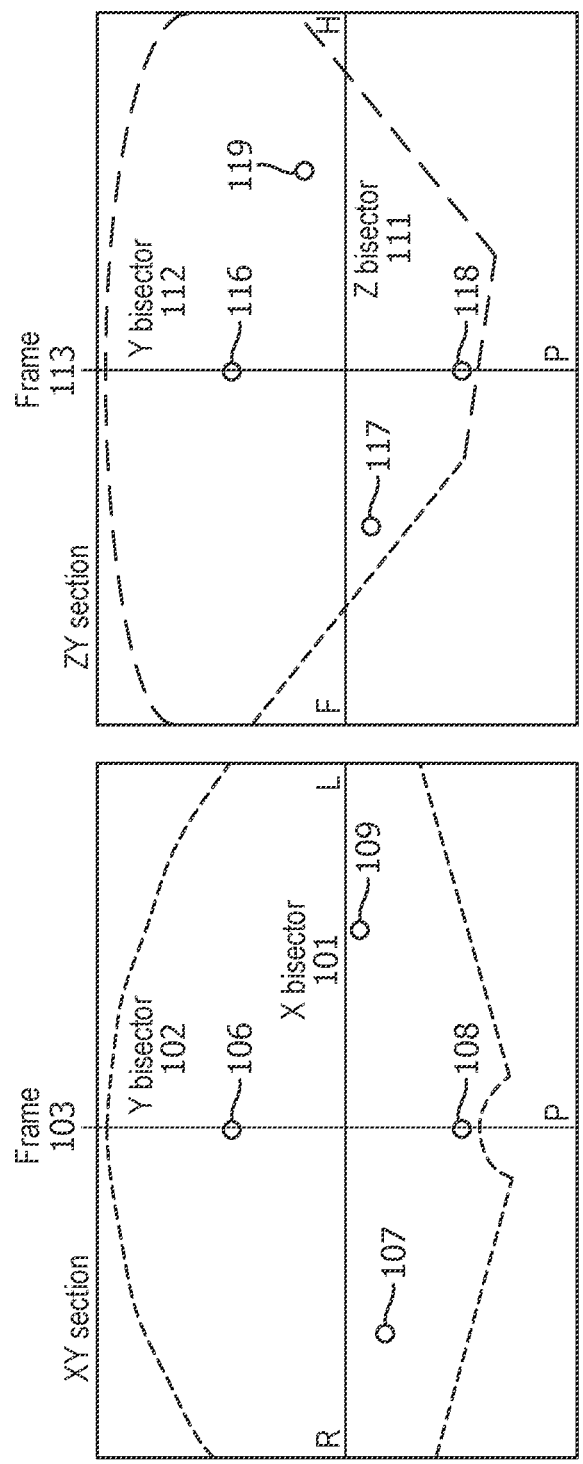
FIG. 1A illustrates views of a structure with landmarks superimposed thereon for landmark visualization for medical image segmentation, in accordance with a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only, and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

FIG. 1A illustrates views of a structure with landmarks superimposed thereon for landmark visualization for medical image segmentation, in accordance with a representative embodiment.

In FIG. 1A, two different cross-sectional views are shown. The views in FIG. 1A may be of either a tissue structure in a medical image or a modeled tissue structure in a model. In FIG. 1A, a first view on the left is framed by frame 103, and a second view on the right is framed by frame 113. The first view on the left is of an XY cross-section and is labelled XY section. The second view on the right is of a ZY cross-section and is labelled ZY section. X may be considered a horizontal direction from a fixed perspective. Y may be considered a vertical direction from the fixed perspective. Z may be considered a depth direction from the fixed perspective. The fixed perspective may be the initial viewpoint for the first view on the left, whereas the second view is from a perspective rotated from the initial viewpoint in order to show the depth.

In FIG. 1A, a first landmark 106, a second landmark 107, a third landmark 108, and a fourth landmark 109 are designated by identical circles in the first view on the left. A first landmark 116, a second landmark 117, a third landmark 118, and a fourth landmark 119 are designated by identical circles in the second view on the right. The broken lines in FIG. 1A may delineate contours of a tissue structure, or may delineate contours of imaging results that contain all or part of a tissue structure. The landmarks in FIG. 1A may all be predetermined, and may be representative of landmark types in different locations for a type of structure or different types of structures in a single model. Although FIG. 1A identifies the first landmark 106, second landmark 107, third landmark 108, fourth landmark 109, first landmark 116, second landmark 117, third landmark 118, and fourth landmark 119, these elements in FIG. 1A may identify landmarks on a modeled tissue structure in a model or corresponding locations on a medical image. In other words, FIG. 1A may be views of either a medical image or a model, and the elements identified as landmarks for FIG. 1A may alternatively be locations on a medical image. As described herein, landmarks on a modeled tissue structure are leveraged to assist in identifying corresponding locations in a medical image, where the structure(s) in the model are of the same type as the structure(s) in the medical image.

Although not shown, descriptive labels can be provided for both tissue structures in a medical image and modeled tissue structures in a model. For example, each or any landmark in a model may be labelled with a descriptive label to help a user understand what on a structure is designated by a landmark. Similarly, a label for an identified location on a medical image may identify how many iterations of segmenting the identified location has survived without being altered, and may be updated each time segmentation on a region that includes the location has been segmented or re-segmented.

In FIG. 1A, in the view to the left, Y bisector 102 is a vertical bisector, and X bisector 101 is a horizontal bisector. In the view to the right, Y bisector 112 is a vertical bisector, and Z bisector 111 is a horizontal bisector. In the view to the left in FIG. 1A, the first landmark 106 and the third landmark 108 are aligned along Y bisector 102. In the view to the right in FIG. 1A, the first landmark 116 and the third landmark 118 are aligned along Y bisector 112. In the view to the left in FIG. 1A, the second landmark 107 is to the left of the Y bisector 102. In the view to the right in FIG. 1A, the second landmark 117 is to the left of the Y bisector 112. In the view to the left in FIG. 1A, the fourth landmark 109 is to the right of the Y bisector 102, and below the X bisector 101, whereas in the view to the right in FIG. 1A, the fourth landmark 119 is to the right of the Y bisector 112, and above the Z bisector 111.

In FIG. 1A, landmarks in both of the first view and the second view may be represented by pairs of coordinate sets that correspond to the same locations in the 3D space that is imaged by the first view and the second view, but also may be individual coordinate sets that correspond to different locations in the 3D space. For example, the first landmark 106 and the first landmark 116 may be the same landmark represented by a pair of coordinate sets, with one pair in the XY plane of the first view and one pair in the ZY plane of the second view. The second landmark 107 and the second landmark 117 may be the same landmark represented by a pair of coordinate sets, with one pair in the XY plane of the first view and one pair in the ZY plane of the second view. The third landmark 108 and the third landmark 118 may be the same landmark represented by a pair of coordinate sets, with one pair in the XY plane of the first view and one pair in the ZY plane of the second view. The fourth landmark 109 and the fourth landmark 119 may be the same landmark represented by a pair of coordinate sets, with one pair in the XY plane of the first view and one pair in the ZY plane of the second view. Alternatively, the fourth landmark 109 and the fourth landmark 119 may be different landmarks that correspond to different locations, such that the different locations each only appear in one or the other of the first view and second view.

The relative placements of locations of the same landmark in the left image and right image may differ between the first view and the second view in that the viewpoint from which the first view is taken may differ from the viewpoint from which the second view is taken. Thus, when the viewpoint for the second view is rotated horizontally ninety (90) degrees from the viewpoint for the first view, the first coordinate for the first view will be a horizontal coordinate, but the first coordinate for the second view will be a depth coordinate whereas the second coordinates for both views will be the vertical coordinate. Therefore, in the left view and the right view, the second coordinate should be the vertical coordinate and should remain the same, whereas the first coordinates may differ insofar as the first coordinates represent different dimensions.

Figure 1B:
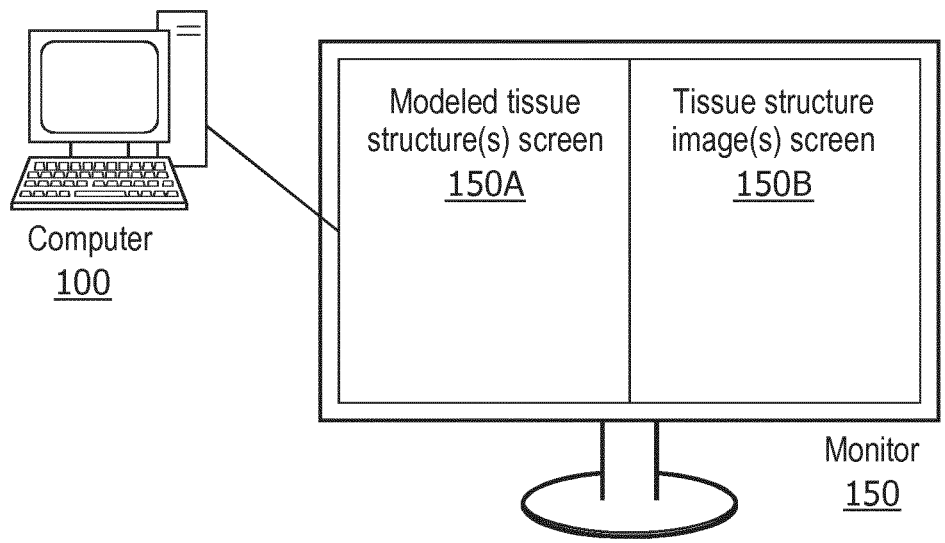
FIG. 1B illustrates a computer system for landmark visualization for medical image segmentation, in accordance with a representative embodiment.

FIG. 1B illustrates a computer system for landmark visualization for medical image segmentation, in accordance with a representative embodiment.

In FIG. 1B, a computer 100 is connected to a monitor 150. The monitor 150 has a screen which is logically divided to show two separate windows/screens, i.e., a modeled tissue structure screen 150A and a tissue structure image(s) screen 150B. In the embodiment of FIG. 1B, an image of a tissue structure of a particular type can be displayed simultaneously and separately from a modeled tissue structure. A single screen of the monitor 150 can be logically divided into different windows that separately contain the different modeled tissue structure and tissue structure. The tissue structure and the modeled tissue structure may be displayed in separate windows on the same screen, or on separate screens. As described herein, individual aspects of the display of the tissue structure and the modeled tissue structure can be coordinated, such as by alternating accentuating of landmarks on a screen with waiting for and recognizing identification of a location corresponding to an accentuated landmark on the same screen or a different screen. By intuitively presenting and correlating landmarks on a modeled tissue structure with locations on an image of a tissue structure of the same type, reliability of the mapping and subsequent segmentation can be improved. The accentuating described herein may be performed by highlighting or otherwise visually isolating and contrasting a landmark from its surroundings. The accentuating may also be performed by focusing on a region that includes a landmark, overlaying a region that includes a landmark, or changing a color of a region that includes a landmark. It may be possible to highlight a region on a medical image where a next location is likely to be found given previous landmarks and previous mapping of the previous landmarks to previous identified locations. In this way, a search space for locating the next location can be reduced to help assist in identifying the next location.

Additionally, any modeled tissue structure described herein may be displayed as a two-dimensional (2D) cross-section or as a volumetric rendering in three-dimensions (3D). Similarly, any tissue structure in a medical image described herein may be displayed as a 2D cross-section or cross-sections or as a 3D volumetric rendering or renderings.

Figure 1C:
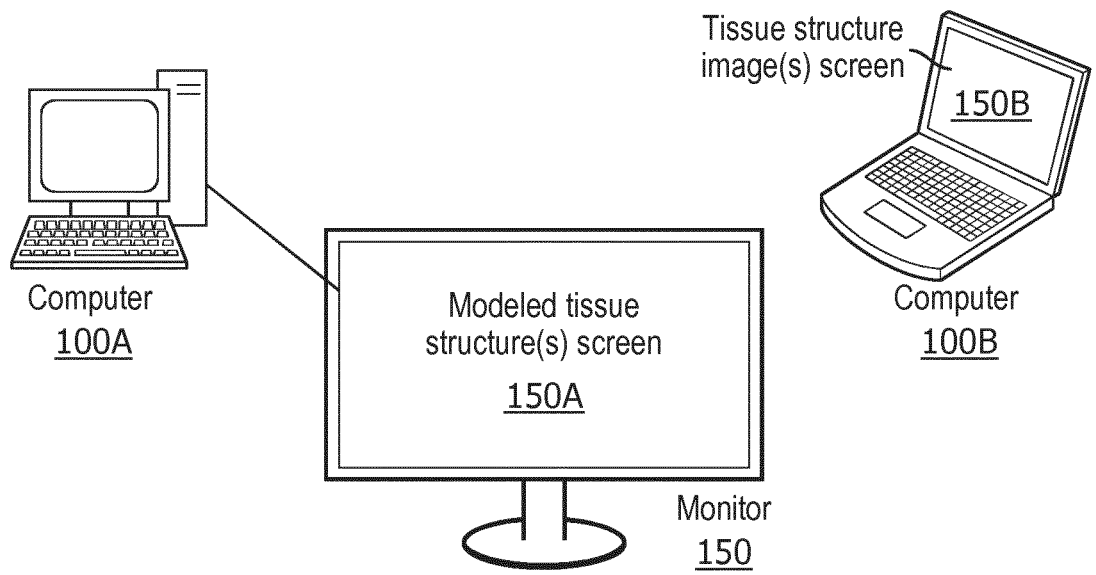
FIG. 1C illustrates another computer system for landmark visualization for medical image segmentation, in accordance with a representative embodiment.

FIG. 1C illustrates another computer system for landmark visualization for medical image segmentation, in accordance with a representative embodiment.

In FIG. 1C, a computer 100A is a first computer and is connected to a monitor (unnumbered) as in FIG. 1B. The monitor (unnumbered) in FIG. 1C shows a single window/screen, i.e., the modeled tissue structure screen 150A. A computer 100B is a separate computer, and includes a monitor (unnumbered) that shows a single window/screen, i.e., the tissue structure image(s) screen 150B.

In FIG. 1B, the computer 100 may be a personal computer that is connected wirelessly or by wire to the monitor 150. By way of comparison, in FIG. 1C the computer 100A may be a personal computer but the computer 100B may be a laptop. The modeled tissue structure screen 150A and the tissue structure image(s) screen 150B may thus be provided on a single display or different displays. In embodiments herein, aspects of the modeled tissue structure screen 150A and the tissue structure image(s) screen 150B are coordinated, and this coordination may be controlled by a single device such as the computer 100 in FIG. 1B or either of the computer 100A or the computer 100B in FIG. 1C.

Figure 2:
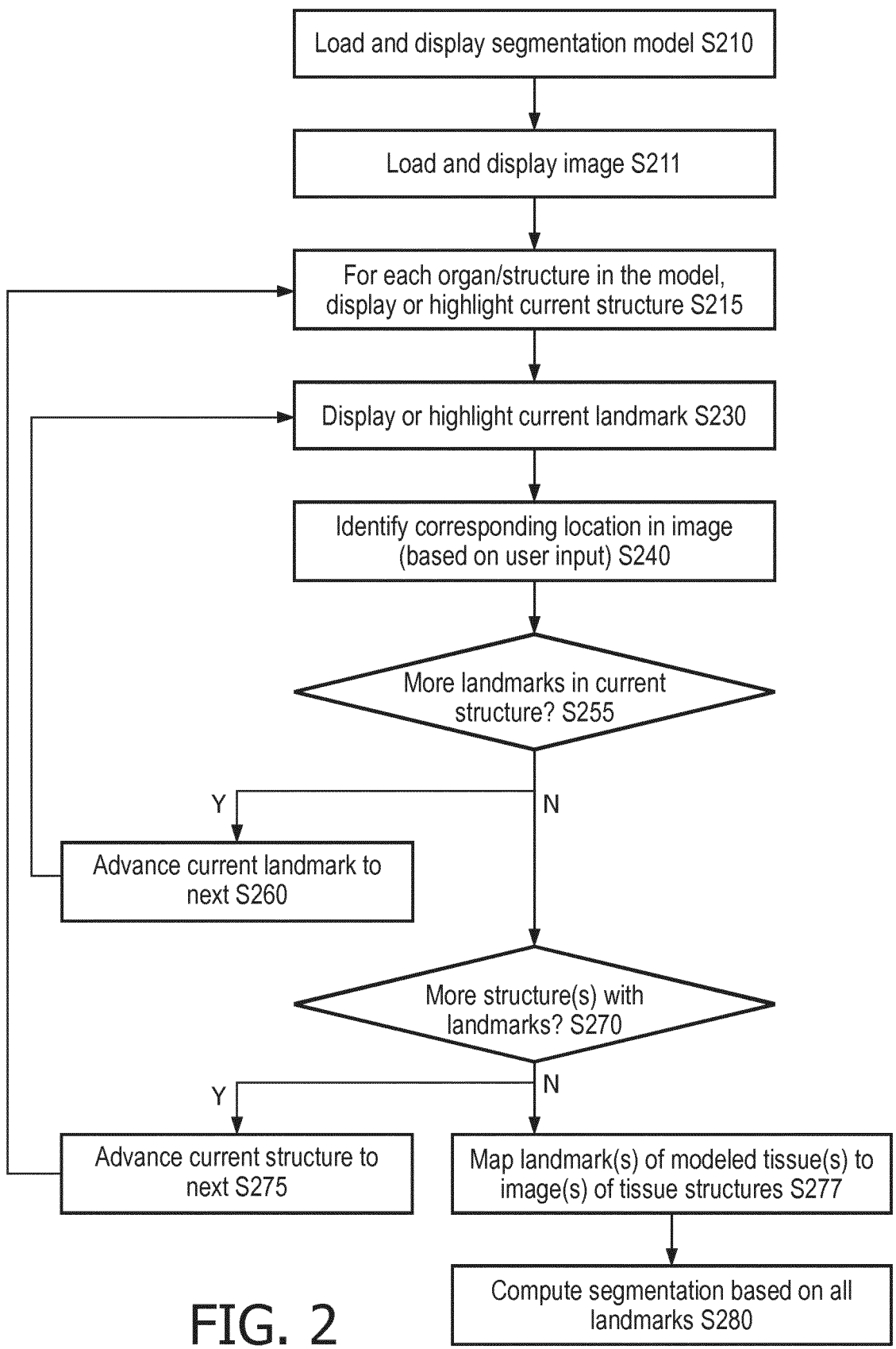
FIG. 2 illustrates a process for landmark visualization for medical image segmentation, in accordance with a representative embodiment.

FIG. 2 illustrates a process for landmark visualization for medical image segmentation, in accordance with a representative embodiment.

In FIG. 2, the process starts at S210 by loading and displaying a segmentation model. A segmentation model is a 2D or 3D model of one or more types of structures, and is therefore a modeled tissue structure. The segmentation model and the medical images described herein can be displayed as 2D models and medical images. The segmentation model of any one structure is based on measurements of multiple structures of the same type. The multiple structures that were measured may include several, dozens, hundreds, thousands or even more of the same type of structure from different patients. The basis of the segmentation model may be average measurements or median measurements of the multiple structures of the same type. Numerous other forms of mathematical processing may also be performed on measurements to obtain the segmentation model, such as by eliminating outliers from consideration. The multiple structures may be tissue structures, such as internal organs. An example of a type of structure is a liver, or a pancreas.

At S211, an image is loaded and displayed. The image loaded and displayed at S211 is of a structure that is of the same type as the structures on which the segmentation model in S210 is based. Thus, the structure in the image at S211 may be a first tissue structure, and the structures on which the segmentation model in S210 is based may be first modeled tissue structures, where the first tissue structures and the first modeled tissue structures are of the same type.

At S215, a current structure is displayed or highlighted for an organ/structure in the segmentation model of S210. In other words, if there is only a single organ/structure in the segmentation model of S210, the displaying or highlighting at S215 will only occur once. If there are multiple organs/structures in the segmentation model of S210, the displaying or highlighting at S215 will be repeated with intermediate processing from S230 to S275 between each iteration. When an organ/structure is displayed but not highlighted, this may mean that the organ/structure of the segmentation model is selectively displayed or illuminated for a time but not at other times. When the organ/structure is highlighted, this may be taken to mean that the organ/structure of the segmentation model is selectively highlighted for a time but not at other times even though the organ/structure is still displayed at the other times. Highlighting a structure may involve selectively brightening, outlining, overlaying, changing a color, or otherwise changing the display characteristics of an area on the modeled tissue structure screen 150A corresponding to the specific organ/structure being highlighted.

At S230, a current landmark is displayed or highlighted. In other words, if there is only a single landmark for the current structure, the displaying or highlighting at S230 will only occur once. If there are multiple landmarks on the current structure from S215, the displaying or highlighting at S230 will be repeated with intermediate processing from S240 to S260 between each iteration. When a landmark is displayed but not highlighted, this may mean that the landmark on the current structure is selectively displayed or illuminated for a time but not at other times. When the landmark is highlighted, this may be taken to mean that the landmark on the current structure is selectively highlighted for a time but not at other times even though the landmark is still displayed at the other times. Highlighting a landmark may involve selectively brightening, outlining, overlaying, changing a color, or otherwise changing the displace characteristics of an area on the modeled tissue structure screen 150A corresponding to the specific landmark being highlighted on the current organ/structure being highlighted.

When both the current organ/structure is highlighted at S215 and the current landmark is highlighted at S230, the highlighting of the current landmark may be different than the highlighting of the current organ/structure. For example, the current organ/structure may be highlighted at S215 by lighting the area of the current organ/structure in the modeled tissue structure screen 150A, whereas the current landmark may be highlighted at S230 relative to the lighted area of the current organ/structure by darkening the current landmark in order to provide a proper contrast. Alternatively, a current organ/structure may be highlighted in a different color than a current landmark, so that the current landmark contrasts the current organ/structure.

At S240, a location in an image corresponding to the landmark in the model is identified. That is, a location in an image of a structure (i.e., the first tissue structure) corresponding to the landmark is identified. The identifying of locations at S240 is based on user input, but by a processor such as by detecting touch input, cursor coordinates, or another form of interpretation of user input by any of, for example, a keyboard, a mouse, a voice control, a touch screen, or other mechanisms for a user to enter user input. User input may be recognized by sensors on a touch screen, a processor that tracks cursor location for a mouse that moves a cursor on a screen, voice and speech recognition that specifies a location on a grid on a screen, or any other form of logical processing that can recognize and interpret user input to device or system.

At S255, a determination is made as to whether there are more landmarks on the current structure, i.e., beyond the current landmark which was just displayed or highlighted at S230. If there are more landmarks (S255=Yes), the current landmark is advanced to a next landmark at S260, and the process returns to S230 to display or highlight the next (now current) landmark at S230. If there are not more landmarks in the current structure (S255=No), the process proceeds to S270.

At S270, a determination is made as to whether there are more structures on the segmentation model, i.e., beyond the current structure which was displayed or highlighted at S215. If there are more structures (S270=Yes), the current structure is advanced to a next structure at S275, and the process returns to S215 to display or highlight the next (now current) structure at S215. If additional structures exist, the segmentation model for a next structure may be based on measurements of multiple structures of the same type. The multiple structures that were measured may include several, dozens, hundreds, thousands or even more of the same type of structure from different patients. The basis of the segmentation model may be average measurements or median measurements of the multiple structures of the same type. Numerous other forms of mathematical processing may also be performed on measurements to obtain the segmentation model, such as by eliminating outliers from consideration.

Logically, the image may contain a first tissue structure, a second tissue structure, and additional tissue structures derived from imaging a patient. The model(s) of tissue structure(s) are based on measurements of previous tissue structures derived from previous imaging of previous patients. Therefore, the process described herein may involve, indirectly, innumerable additional tissue structures that were used as the basis of the models.

If there are not more structures (S270=No), the landmarks on the modeled tissue structures are mapped to image(s) of the tissue structures at S277. Mapping the landmarks on the modeled tissue structures to the locations of the tissue structures may involve transforming coordinates of the landmarks in the segmentation model to coordinates for the corresponding locations in an image, or vice versa. Once a predetermined number, e.g., three, of locations in the image are identified based on matches with landmarks, some or all locations in the image or in a region (i.e. less than all) of the image may have coordinates transformed to the coordinate system of the segmentation model in the segmentation at S280. The transformation of a medical image to be aligned with a segmentation model is referred to herein as fitting, and refers to fitting the entirety of the medical image to the segmentation model such as by confirming the medical image or changing the medical image to align with characteristics of the segmentation model. Fitting is performed based on the mapping described herein, insofar as the mapping provides a predetermined spatial relationship between a modeled tissue structure and a tissue structure in a medical image, i.e., due to the correlating between identified landmarks on the model and identified locations in the medical image. Fitting a modeled tissue structure to a medical image of a tissue structure may be based on mapping as few as three landmarks on the modeled tissue structure to locations of the tissue structure, though accuracy may be enhanced and/or confirmed with a larger number of landmarks and locations. In this way, a structure in an image from a patient may be segmented based on an idealized segmentation model from measurements of structures of the same type for previous patients. The segmentation may be performed for the entirety of the image, or for a portion that is less than the entirety of the image, or a portion that is less than the entirety of a structure or structures in the image. In this way, segmentation may be iteratively performed as additional landmarks are displayed or highlighted and additional locations for the additional landmarks are identified on the image. Stated perhaps differently, a first segmentation of a medical image may be analogous to a first draft, and subsequent segmentations of the medical image may be analogous to subsequent drafts that are improvements of the first draft.

In an embodiment, a first modeled tissue structure may be fitted to a first tissue structure after a predetermined number of landmarks and locations are identified based on determining that the predetermined number of landmarks and locations are identified. As an additional landmark is identified, a region on the medical image where the corresponding location for the additional landmark is expected may be accentuated to help guide selection of the location. As noted previously, accentuating may be provided by focusing on a region, overlaying a region, or changing a color of a region, as well as by lightening or darkening a region.

In another embodiment, a first modeled tissue structure may be fitted to a first tissue structure after a predetermined number of landmarks and locations are identified based on determining that the predetermined number of landmarks and locations are identified. As an additional landmark and location are identified, the first modeled tissue structure may be again fitted to the first tissue structure based on the original landmarks and locations and the additional landmarks and locations. Moreover, when an additional landmark is identified, a segmented region of the medical image may be accentuated to show that it will be changed when the corresponding location in the medical image is changed. In this way, selection of a location after segmenting has already occurred in an iterative process may show how additional identifications of locations for additional landmarks will affect previous segmentation results. A next segmentation of a structure may be optimized using features such as intensities and gradients near a current segmentation. A region can be highlighted by, for example, changing colors where different colors correspond to different predetermined amounts of change. For example, the color red could represent the most change in an upper quartile of 75% to 100% of a maximum change); the color yellow could represent the next quartile of change from 50% to 75%, and the color green could represent the quartile from 25% to 50% of the maximum change.

Figure 3:
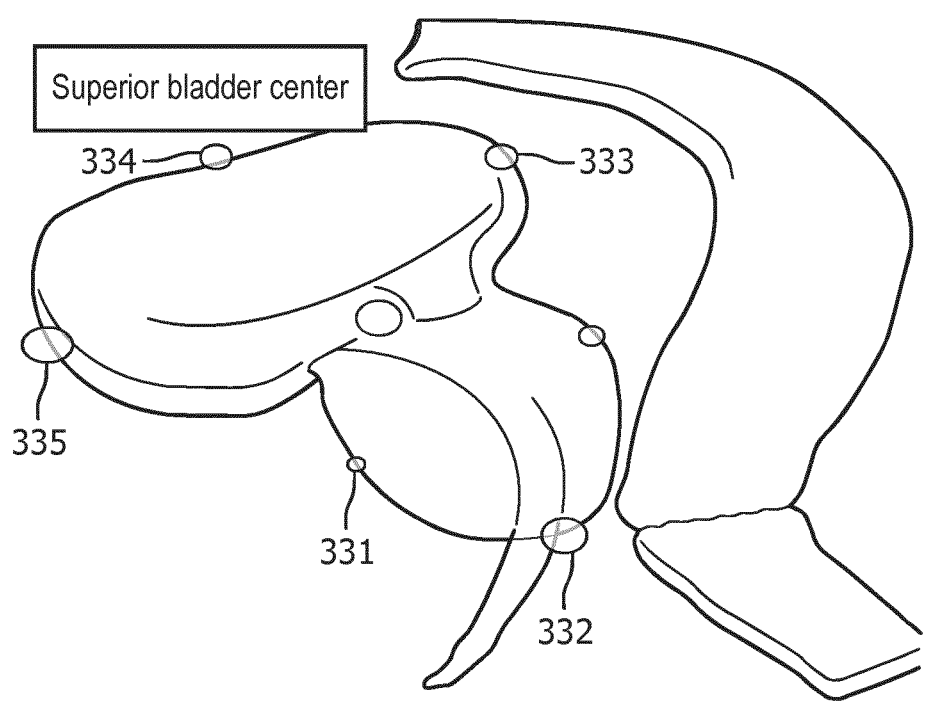
FIG. 3 illustrates a view of a segmentation model of types of structures with landmarks superimposed thereon for landmark visualization for medical image segmentation, in accordance with a representative embodiment.

FIG. 3 illustrates a view of a segmentation model of types of structures with landmarks superimposed thereon for landmark visualization for medical image segmentation, in accordance with a representative embodiment.

In FIG. 3, five landmarks 331-335 are shown on a segmentation model of a single structure (i.e., to the left) of a multi-structural organ. No landmarks are shown on the structure to the right in the segmentation model in FIG. 3. As described herein, each of the landmarks 331-335 can be individually and sequentially displayed and highlighted/accentuated in order to assist a user in identifying which locations to identify on an image of a structure. The term sequentially as used herein for landmarks may be taken to mean that individual landmarks or at least groups of fewer than all landmarks, are displayed and highlighted/accentuated at any one time in an ordered sequence. For example, three or more landmarks may be individually displayed and highlighted/accentuated one at a time. Similarly, each of the structures in the segmentation model of the multi-structural organ can be individually and sequentially displayed and highlighted/accentuated in order to assist the user in identifying which structure of the multi-structural organ to check for locations corresponding to a particular landmark.

Figure 4:
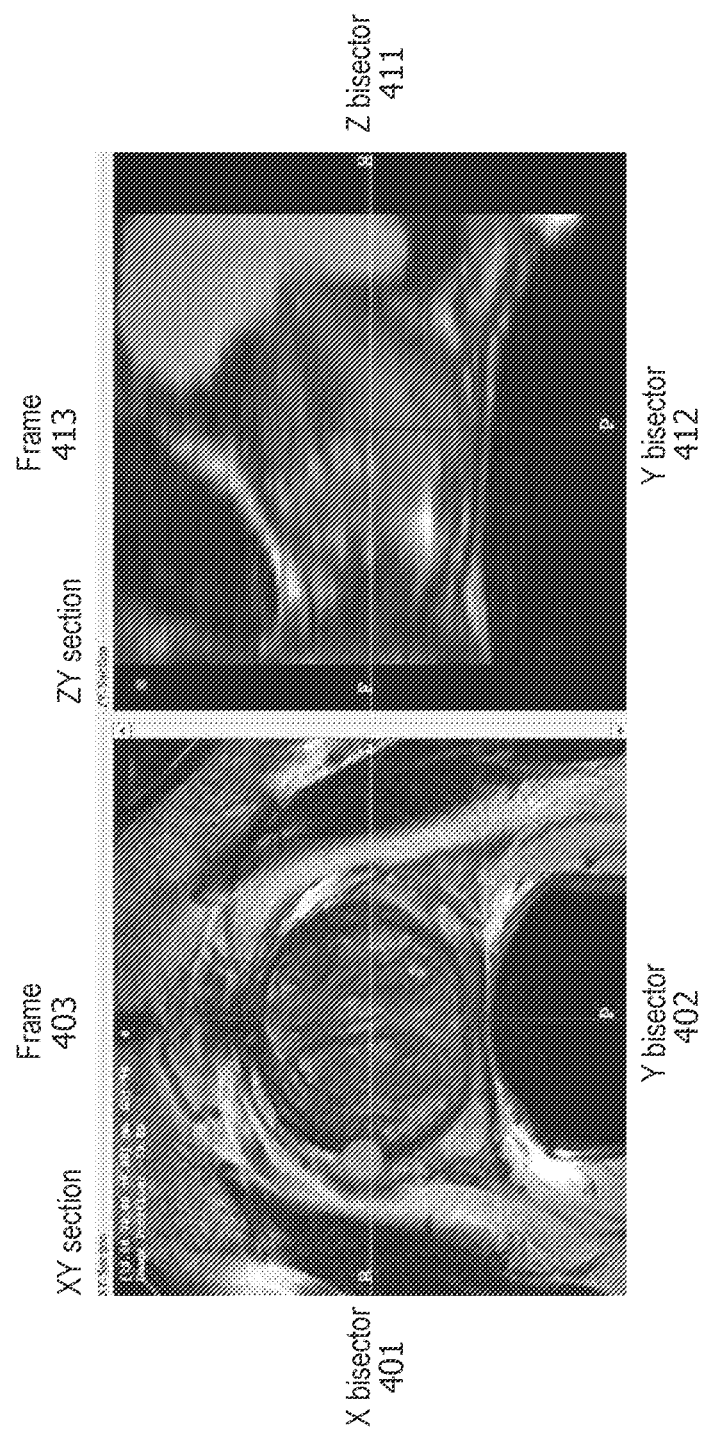
FIG. 4 illustrates a view of an image with a user-defined landmark designating the location corresponding to a landmark on a structure in FIG. 3, in accordance with a representative embodiment.

FIG. 4 illustrates views of an image with a user-defined landmark designating the location corresponding to a landmark on a structure in FIG. 3, in accordance with a representative embodiment.

In FIG. 4, two different cross-sectional images are shown. The first image is on the left and is an XY cross-section, and the second image is on the right and is a ZY cross-section. The first image on the left may be taken from an initial viewpoint, and the second image on the right may be from a perspective rotated from the initial viewpoint in order to show the depth. A single landmark is user-defined and is designated by a circle in the first image on the left but not on the second image on the right. The user-defined landmark is to the left of a vertical bisector and aligned on a horizontal bisector in the image to the left. The user-defined landmark in the first image to the left in FIG. 4 may correspond to the landmark labelled "1" in the segmentation model of FIG. 3.

In FIG. 4, a first image on the left is framed by frame 403, and a second image on the right is framed by frame 413. The first image on the left is of the XY cross-section and is labelled XY section. The second image on the right is of the ZY cross-section and is labelled ZY section. In the first image on the left, an X bisector 401 bisects the first image horizontally, and Y bisector 402 bisects the first image vertically. The single circle in the first image designates a user defined landmark 406. In the second image on the right, a Z bisector 411 bisects the second image horizontally, and Y bisector 412 bisects the second image vertically. No user-defined landmarks appear in the image to the right in FIG. 4.

In FIG. 4, landmarks in the first image and the second image may be represented by pairs of coordinate sets that correspond to the same locations in the 3D space that is imaged by the first image and the second image, but also may be individual coordinate sets that correspond to different locations in the 3D space. The landmark is a single user-defined landmark that only appears in the view to the left in FIG. 4, and may correspond only to a single set of XY coordinates.

Figure 5:
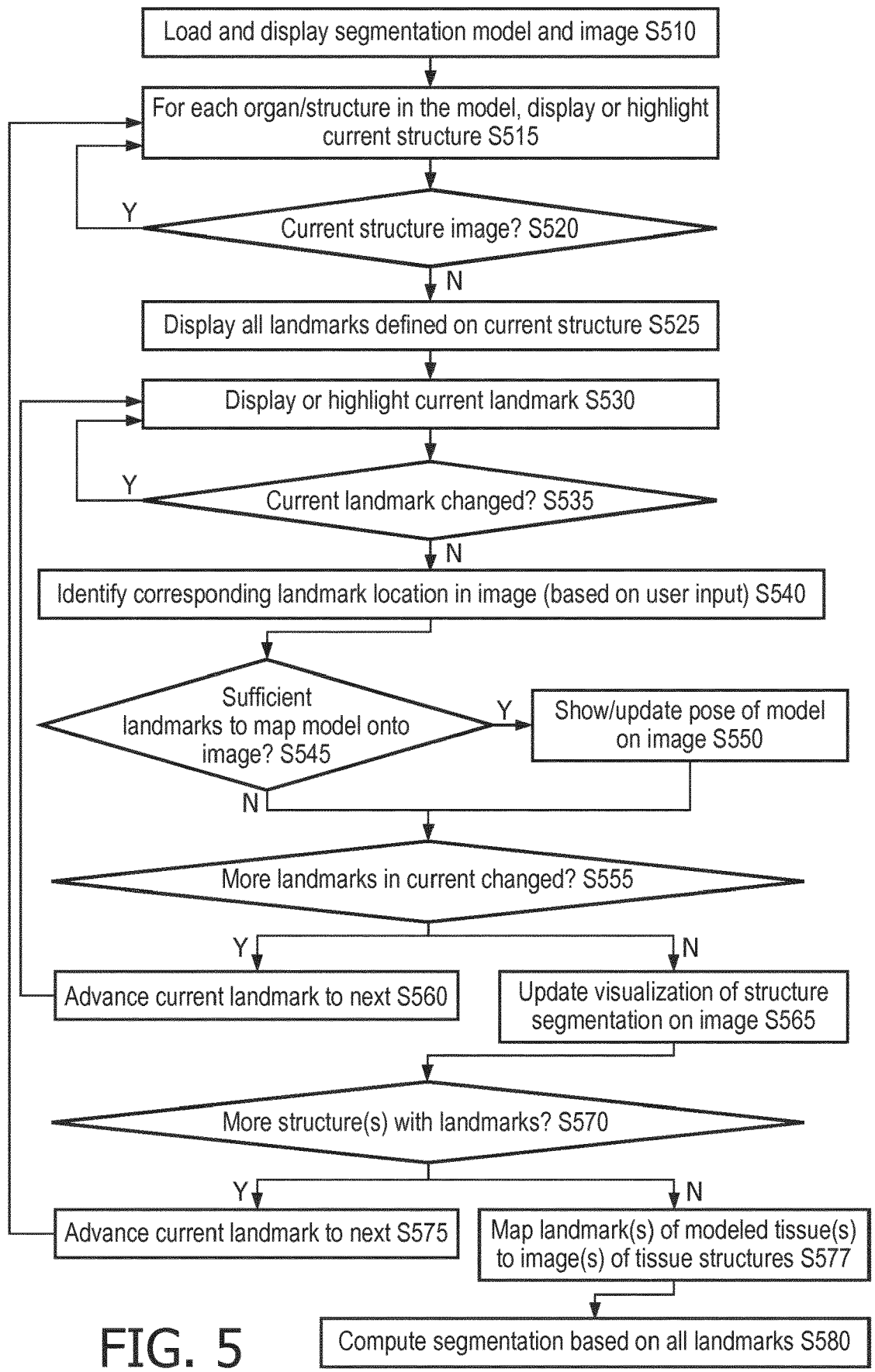
FIG. 5 illustrates another process for landmark visualization for medical image segmentation, in accordance with a representative embodiment.

In FIG. 5, the process starts at S510 by loading and displaying a segmentation model and an image. At S515, a current structure is displayed or highlighted for an organ/structure in the segmentation model of S510. At S520, a determination is made as to whether a current structure is changed. In other words, at S520 a determination is made as to whether an instruction is received to change a current structure to a next structure, such as based on user input.

If the current structure is to be changed (S520=Yes), the process returns to S515 to display or highlight the current structure based on the change determined at S520. If the current structure is not to be changed (S520=No), the process moves to S525 and all landmarks defined on the current structure are displayed. At S530, a current landmark is displayed or highlighted to individually accentuate the current landmark relative to other landmarks. If there is only a single landmark for the current structure, the displaying or highlighting at S530 will only occur once. If there are multiple landmarks on the current structure from S515, the displaying or highlighting at S530 will be repeated with intermediate processing from S535 to S560 between each iteration.

At S535, a determination is made whether to change the current landmark. If the current landmark is to be changed (S535=Yes), the current landmark is changed to the next landmark and the process returns to S530 to display or highlight the new current landmark. If the current landmark is not changed (S535=No), a location corresponding to the landmark is identified in an image at S540. The location may be identified based on input from the user, though the input must be detected by the input device, such as by detecting a touch on a determinable location on a touch screen, interpreting voice input, determining a location of a cursor on a screen, and so on. Similarly, a change to the current landmark at S535 or to the current structure at S520 above may also be based on user input detected from a keyboard, mouse, touch-screen, audible (speech) input, or any other known form of inputting instructions to an electronic device.

At S545, a determination is made whether there are sufficient landmarks to map a model onto an image. If there are sufficient landmarks (S545=Yes), a pose of a model on an image is shown or updated at S550, and a determination is made at S555 as to whether there are more landmarks in the current structure. If there are not sufficient landmarks to map the model onto the image (S545=No), the determination is made as to whether more landmarks are present in the current structure at S555.

If there are more landmarks in the current structure (S555=Yes), the current landmark is advanced to the next landmark at S560, and the process returns to S530 where the next landmark is displayed or highlighted. If there are not more landmarks in the current structure (S555=No), the process proceeds to S565 where a visualization of the structure segmentation on the image is updated at S565, and then the process proceeds to S570.

At S570, a determination is made as to whether there are more structures on the segmentation model, i.e., beyond the current structure which was displayed or highlighted at S515. If there are more structures (S570=Yes), the current structure is advanced to a next structure at S575, and the process returns to S515 to display or highlight the next (now current) structure at S515. If additional structures exist, the segmentation model for a next structure may be based on previous structures of the same type as the next structure.

If there are not more structures (S570=No), the landmarks on the modeled tissue structures are mapped to image(s) of the tissue structures at S577. Mapping may involve transforming coordinates of the landmark in the segmentation model to the corresponding location in an image. Once a predetermined number of landmarks in the model and locations in the image are identified, all locations in the image may have coordinates transformed to the coordinate system of the segmentation model in the segmentation at S580. In other words, a process in FIG. 5 may include mapping a predetermined number of landmarks to corresponding locations. In this way, a structure in an image from a patient may be segmented based on an idealized segmentation model from measurements of structures of the same type for previous patients. As an example, when three landmarks in a model are identified and three corresponding locations on an image are identified, segmentation may be partially or fully performed. Additionally, segmentation may be performed again when additional landmarks and additional locations are identified. In other words, a process in FIG. 5 may include reperforming the mapping to include a predetermined number of additional landmarks when the mapping and segmenting are performed iteratively.

In FIG. 5, an iterative process for a multi-structure segmentation model may be performed wherein landmarks for a first structure are sequentially identified, corresponding locations in a medical image are next identified, and the process switches to a second structure once all locations or a predetermined minimum number of locations for the first structure are identified. Once a structure or structures are processed in FIG. 5, a user may be given the option to alter a first segmented image or a second segmented image, such as by changing a location previously identified for a previous landmark. Thus, even after a user has provided input resulting in identifying locations, the locations can be altered at the request of the user. In other words, if a user recognizes a mistake based on the mapping or the full segmentation results, input from the user may be detected and used to allow the user to control alterations to the segmenting. Stated differently, segmenting may be partially or fully re-performed by allowing a user to change a previous identification of a location on a medical image and then re-mapping and/or re-segmenting the medical image.

Figure 6:
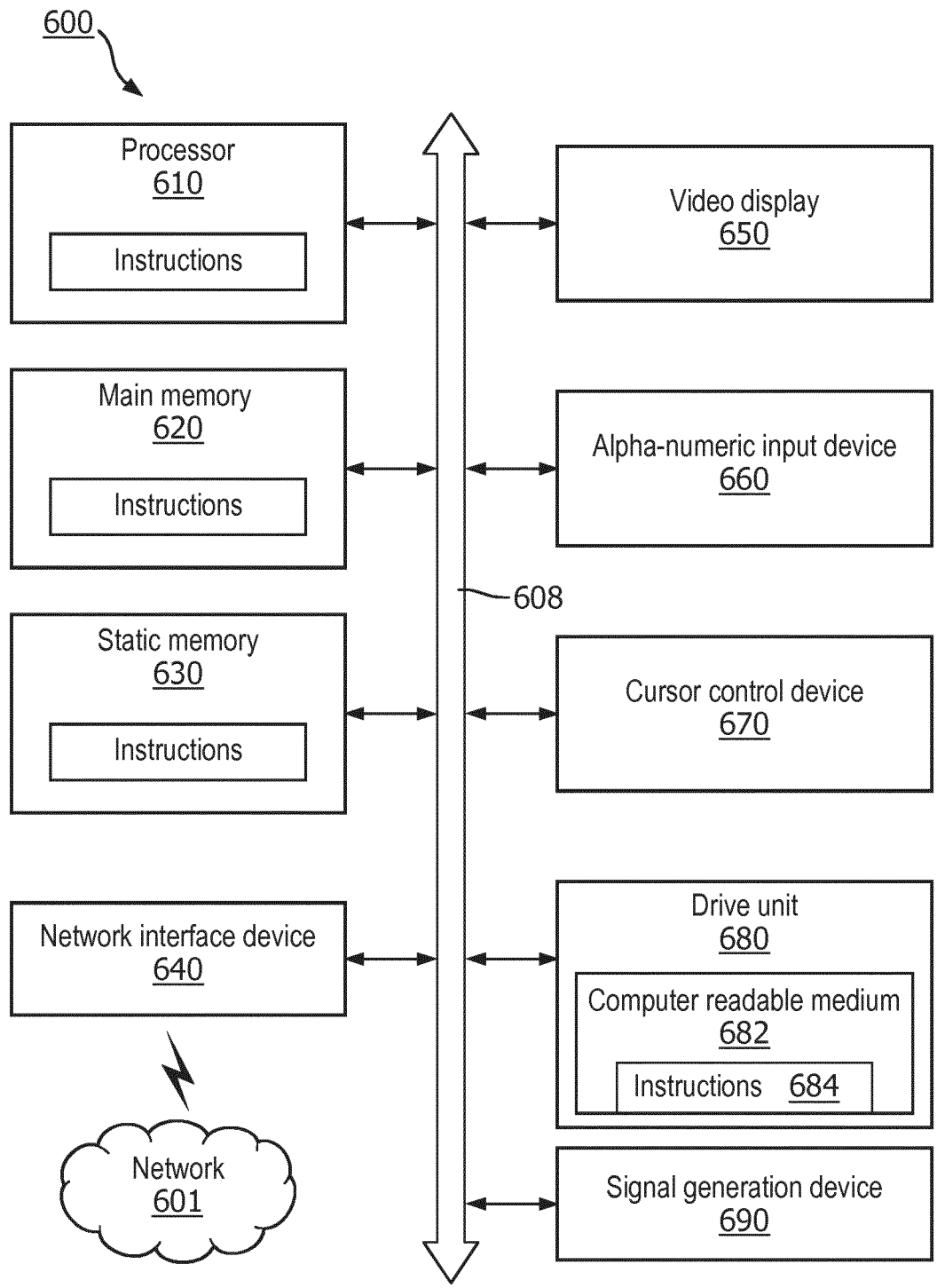
FIG. 6 illustrates an exemplary general computer system that includes a set of instructions for landmark visualization for medical image segmentation, in accordance with a representative embodiment.

FIG. 6 illustrates an exemplary general computer system that includes a set of instructions for landmark visualization for medical image segmentation, in accordance with a representative embodiment. FIG. 6 is an illustrative embodiment of a computer system 600, on which a method of landmark visualization for medical image segmentation can be implemented. The computer system 600 can include a set of instructions that can be executed to cause the computer system 600 to perform any one or more of the methods or computer based functions disclosed herein. The computer system 600 may operate as a standalone device or may be connected, for example, using a network 601, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a stationary computer, a mobile computer, a personal computer (PC), a laptop computer, a tablet computer, a mobile communications device with a display, a personal digital assistant (PDA), or any other machine capable of executing a set of instructions (sequential or otherwise) that specify actions to be taken by that machine. The computer system 600 can be incorporated as or in a particular device that in turn is in an integrated system that includes additional devices. In a particular embodiment, the computer system 600 can be implemented using electronic devices that provide voice, video or data communication. Further, while the computer system 600 is illustrated in the singular, the term "system" shall also be taken to include any collection of systems or sub-systems that individually or jointly execute a set, or multiple sets, of instructions to perform one or more computer functions.

As illustrated in FIG. 6, the computer system 600 includes a processor 610. A processor for a computer system 600 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 600 is configured to execute software instructions in order to perform functions as described in the various embodiments herein. A processor for a computer system 600 may be a general-purpose processor or may be part of an application specific integrated circuit (ASIC). A processor for a computer system 600 may also be a microprocessor, a microcomputer, a processor chip, a controller, a microcontroller, a digital signal processor (DSP), a state machine, or a programmable logic device. A processor for a computer system 600 may also be a logical circuit, including a programmable gate array (PGA) such as a field programmable gate array (FPGA), or another type of circuit that includes discrete gate and/or transistor logic. A processor for a computer system 600 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 600 includes a main memory 620 and a static memory 630 that can communicate with each other via a bus 608. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

The computer system 600 or a combination of the components of the computer system 600 may be considered a controller. For example, the main memory 620 may store instructions executed by the processor 610 in order to perform some or all of the functions, steps, or individual processes described herein. For example, a processor 610 may perform logical determinations as described herein in order to obtain results that vary based on the logical determinations, and the logical determinations and results may be a form of control by the controller that includes the processor 610. Of course, a controller may include additional elements of the computer system 600 besides a main memory 620 and/or processor 610.

As shown, the computer system 600 may further include a video display unit 650, such as a liquid crystal display (LCD), an organic light emitting diode (OLED), a flat panel display, a solid-state display, or a cathode ray tube (CRT). Additionally, the computer system 600 may include an input device 660, such as a keyboard/virtual keyboard or touch-sensitive input screen or speech input with speech recognition, and a cursor control device 670, such as a mouse or touch-sensitive input screen or pad. The computer system 600 can also include a disk drive unit 680, a signal generation device 690, such as a speaker or remote control, and a network interface device 640.

In a particular embodiment, as depicted in FIG. 6, the disk drive unit 680 may include a computer-readable medium 682 in which one or more sets of instructions 684, e.g. software, can be embedded. Sets of instructions 684 can be read from the computer-readable medium 682. Further, the instructions 684, when executed by a processor, can be used to perform one or more of the methods and processes as described herein. In a particular embodiment, the instructions 684 may reside completely, or at least partially, within the main memory 620, the static memory 630, and/or within the processor 610 during execution by the computer system 600.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 682 that includes instructions 684 or receives and executes instructions 684 responsive to a propagated signal; so that a device connected to a network 601 can communicate voice, video or data over the network 601. Further, the instructions 684 may be transmitted or received over the network 601 via the network interface device 640.

Accordingly, landmark visualization for medical image segmentation enables intuitive coordination between landmarks on a segmentation model and selection of corresponding locations on an image of a structure. This can be accomplished by sequentially accentuating individual landmarks on a first modeled tissue structure, and then identifying corresponding locations on an image of a tissue structure.

Although landmark visualization for medical image segmentation has been described with reference to several exemplary embodiments, it is understood that the words that have been used are words of description and illustration, rather than words of limitation. Changes may be made within the purview of the appended claims, as presently stated and as amended, without departing from the scope and spirit of landmark visualization for medical image segmentation in its aspects. Although landmark visualization for medical image segmentation has been described with reference to particular means, materials and embodiments, landmark visualization for medical image segmentation is not intended to be limited to the particulars disclosed; rather landmark visualization for medical image segmentation extends to all functionally equivalent structures, methods, and uses such as are within the scope of the appended claims.

For example, the application generally describes accentuating landmarks one at a time. However, landmarks may be accentuated in subgroups of more than one landmark, and corresponding locations may be identified in subgroups of more than one location, such as when two landmarks are far apart on a modeled tissue structure such that it is extremely unlikely that a user could confuse corresponding locations for the two landmarks.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A controller for preparing an image for segmenting, comprising:
   a memory that stores instructions; and
   a processor that executes the instructions,
   wherein, when executed by the processor, the instructions cause the controller to perform a process comprising:
   displaying a first modeled tissue structure of a first type, the first modeled tissue structure based on previous measurements of a same type of anatomical structure from multiple patients;
   displaying an image of a first tissue structure of the first type separate from the first modeled tissue structure;
   identifying, on the first modeled tissue structure, landmarks on the first modeled tissue structure for identification on the image of the first tissue structure, and sequentially accentuating each landmark on the first modeled tissue structure;
   identifying, by the processor, locations on the image of the first tissue structure for each landmark on the first modeled tissue structure;

determining that a predetermined number of landmarks and locations are identified for the first type, and mapping the predetermined number of landmarks on the first modeled tissue structure to the locations identified on the image of the first tissue structure based on determining that the predetermined number of landmarks and locations are identified for the first type;

segmenting the image of the first tissue structure in a first region based on the mapping of the predetermined number of landmarks to the locations;

identifying, on the first modeled tissue structure, at least one additional landmark on the first modeled tissue structure for identification on the image of the first tissue structure, and sequentially accentuating the at least one additional landmark on the first modeled tissue structure;

identifying, by the processor, additional locations on the image of the first tissue structure for each additional landmark on the first modeled tissue structure; and determining that a predetermined number of additional landmarks and locations are identified, and mapping the landmarks and additional landmarks on the first modeled tissue structure to the locations and additional locations identified on the image of the first tissue structure based on determining that the predetermined number of additional landmarks and locations are identified.

2. The controller of claim 1, wherein the process performed by the controller based on the processor executing the instructions further comprises:

alternating accentuating of landmarks on the first modeled tissue structure with identifications of locations on the image of the first tissue structure.

3. The controller of claim 1, wherein the process performed by the controller based on the processor executing the instructions further comprises:

for each additional landmark on the first modeled tissue structure, determining that the first region will change if a corresponding location in the image is changed, and accentuating the first region in the image based on the determining.

4. The controller of claim 1, wherein the process performed by the controller based on the processor executing the instructions further comprises:

displaying a first descriptive label for at least one of the first type of the first tissue structure and the landmarks on the first modeled tissue structure, wherein the first modeled tissue structure and the image of the first tissue structure are displayed as a two-dimensional (2D) cross-section or as a volumetric rendering.

5. The controller of claim 1, wherein the process performed by the controller based on the processor executing the instructions further comprises:

identifying a region of the image of the first tissue structure corresponding to a next landmark identified in the identifying; and accentuating the region of the image of the first tissue structure before identifying a next location on the image of the first tissue structure corresponding to the next landmark, wherein the accentuating the region comprises at least one of focusing on the region, overlaying the region, and changing a color of the region.

6. The controller of claim 1, wherein the process performed by the controller based on the processor executing the instructions further comprises:

displaying a second modeled tissue structure of a second type;

displaying an image of a second tissue structure of the second type separate from the second modeled tissue structure;

identifying, on the second modeled tissue structure, landmarks on the second modeled tissue structure for identification on the image of the second tissue structure, and sequentially accentuating each landmark on the second modeled tissue structure;

identifying, by the processor, locations on the image of the second tissue structure for each landmark on the second modeled tissue structure; and determining that a predetermined number of landmarks and locations are identified for the second type, and mapping the predetermined number of landmarks on the second modeled tissue structure to the locations identified on the image of the second tissue structure based on determining that the predetermined number of landmarks and locations are identified for the second type.

7. The controller of claim 6, wherein the process performed by the controller based on the processor executing the instructions further comprises:

iteratively mapping the landmarks on the first modeled tissue structure to the locations on the image of the first tissue structure before iteratively mapping the landmarks on the second modeled tissue structure to the locations on the image of the second tissue structure.

8. The controller of claim 7, wherein the process performed by the controller based on the processor executing the instructions further comprises:

segmenting the image of the first tissue structure and the image of the second tissue structure once a predetermined number of landmarks for the first modeled tissue structure and the second modeled tissue structure have been mapped.

9. The controller of claim 8, wherein the process performed by the controller based on the processor executing the instructions further comprises:

simultaneously displaying segmentation for the first tissue structure and the second tissue structure.

10. A system, comprising:

a memory that stores instructions, and a processor that executes the instructions, wherein, when executed by the processor, the instructions cause the system to perform a process comprising:

displaying a first modeled tissue structure of a first type, the first modeled tissue structure based on previous measurements of a same type of anatomical structure from multiple patients;

displaying an image of a first tissue structure of the first type separate from the first modeled tissue structure;

identifying, on the first modeled tissue structure, landmarks on the first modeled tissue structure for identification on the image of the first tissue structure, and sequentially accentuating each landmark on the first modeled tissue structure;

identifying, by the processor, locations on the image of the first tissue structure for each landmark on the first modeled tissue structure;

mapping the landmarks on the first modeled tissue structure to the locations identified on the image of the first tissue structure;

displaying a second modeled tissue structure of a second type, the second modeled tissue structure based on previous measurements of a same type of anatomical structure from multiple patients;

displaying an image of a second tissue structure of the second type separate from the second modeled tissue structure;

identifying, on the second modeled tissue structure, landmarks on the second modeled tissue structure for identification on the image of the second tissue structure, and sequentially accentuating each landmark on the second modeled tissue structure;

identifying, by the processor, locations on the image of the second tissue structure for each landmark on the second modeled tissue structure, mapping the landmarks on the second modeled tissue structure to the locations identified on the image of the second tissue structures;

determining that a predetermined number of landmarks on the first modeled tissue structure are identified, and using a predetermined spatial relationship between the first modeled tissue structure and the second modeled tissue structure, fitting the second modeled tissue structure to the image of the second tissue structure based on determining that the predetermined number of landmarks on the first modeled tissue structure are identified; and accentuating, on the second modeled tissue structure, an additional landmark, and accentuating a region of the image of the second tissue structure in which an additional location corresponding to the additional landmark is to be identified.

* * * * *